(12) United States Patent
Tischler et al.

(10) Patent No.: US 10,751,815 B2
(45) Date of Patent: *Aug. 25, 2020

(54) SHEAR BLADE AND CUTTING DEVICE

(71) Applicant: LUKAS Hydraulik GmbH, Erlangen (DE)

(72) Inventors: Herbert Tischler, Erlangen (DE);
Tammy Horne, Gastonia, NC (US);
Carsten Sauerbier, Lauf (DE)

(73) Assignee: LUKAS Hydraulik GmbH, Erlangen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/345,093

(22) PCT Filed: Oct. 28, 2016

(86) PCT No.: PCT/EP2016/076065
§ 371 (c)(1),
(2) Date: Apr. 25, 2019

(87) PCT Pub. No.: WO2018/077418
PCT Pub. Date: May 3, 2018

(65) Prior Publication Data
US 2019/0255631 A1    Aug. 22, 2019

(51) Int. Cl.
*B23D 35/00* (2006.01)
*B23D 29/00* (2006.01)
(Continued)

(52) U.S. Cl.
CPC ............ *B23D 35/001* (2013.01); *A62B 3/005* (2013.01); *B23D 17/00* (2013.01); *B23D 29/00* (2013.01);
(Continued)

(58) Field of Classification Search
CPC ........ A62B 3/005; B23D 17/00; B23D 29/00; B23D 29/005; B23D 31/008; B23D 35/001; B32D 35/002
(Continued)

(56) References Cited

U.S. PATENT DOCUMENTS 3,146,656 A    9/1964  Richards
3,929,044 A *  12/1975 Beauchet ............. B23D 35/002
                                                82/46
(Continued)

FOREIGN PATENT DOCUMENTS

AT         511 457 A4     12/2012
DE    20 2004 012 247 U1  10/2004
(Continued)

OTHER PUBLICATIONS

International Search Report and Written Opinion of the International Searching Authority for corresponding International Patent Application No. PCT/EP2016/076065 dated Jun. 27, 2017, 11 pages.

*Primary Examiner* — Hwei-Siu C Payer
(74) *Attorney, Agent, or Firm* — Merchant & Gould P.C.

(57) ABSTRACT

A shear blade is for a portable hydraulic cutting device having a blade body. The blade body has assembly and cutting regions, with a cutting edge in the cutting region. A contact surface is on one side of the cutting edge for an additional shear blade. An outer surface on the other side of the cutting edge acts on the object to be cut. A first surface portion of the outer surface extends away from the cutting edge along an orthogonal, which meets the contact surface at the cutting edge, or at an acute angle α relative to the orthogonal. A second surface portion connects to the first surface portion at an acute angle β to the orthogonal. A third surface portion connects to the second surface portion at an
(Continued)

acute angle γ to the orthogonal. Angle α is smaller than angle β, which is smaller than angle γ.

15 Claims, 7 Drawing Sheets

(51) Int. Cl.
*A62B 3/00* (2006.01)
*B23D 17/00* (2006.01)
*B23D 31/00* (2006.01)

(52) U.S. Cl.
CPC ......... *B23D 29/005* (2013.01); *B23D 31/008* (2013.01); *B23D 35/002* (2013.01)

(58) Field of Classification Search
USPC .................................. 30/228, 349, 356, 357
See application file for complete search history.

(56) References Cited

U.S. PATENT DOCUMENTS

| | | | | |
|---|---|---|---|---|
| 4,043,367 A * | 8/1977 | Knuth | ................... | B23D 49/14 30/501 |
| 4,417,510 A * | 11/1983 | Sharp | ................... | B23D 31/008 100/218 |
| 4,422,240 A * | 12/1983 | Wallace | ............... | A01G 3/0475 30/254 |
| 5,243,761 A * | 9/1993 | Sullivan | ................. | A62B 3/005 173/169 |
| 5,873,168 A * | 2/1999 | Johnson | ................. | B23D 17/00 241/101.73 |
| 7,255,295 B2 * | 8/2007 | Ramun | ................... | A62B 3/005 241/266 |
| 7,455,004 B2 * | 11/2008 | Li | ........................ | B23D 35/001 83/495 |
| 9,517,364 B2 * | 12/2016 | Herwig | ................... | F16G 15/06 |
| 9,604,294 B2 * | 3/2017 | Strohmeier | .......... | B23D 35/002 |
| 2012/0102763 A1 * | 5/2012 | Rozumovich | .......... | B23D 29/00 30/357 |
| 2014/0123824 A1 * | 5/2014 | Strohmeier | ............ | B23D 35/00 83/694 |
| 2014/0319257 A1 * | 10/2014 | Clemons | ................. | E02F 3/965 241/266 |
| 2015/0314460 A1 * | 11/2015 | Wakabayashi | .......... | B26B 13/28 30/254 |
| 2018/0021603 A1 * | 1/2018 | Horne | .................... | A62B 3/005 254/93 R |
| 2019/0255631 A1 * | 8/2019 | Tischler | ................. | B23D 17/00 |
| 2019/0270145 A1 * | 9/2019 | Tischler | ............... | B23D 29/005 |

FOREIGN PATENT DOCUMENTS

DE    10 2009 059 940 B4    6/2011
EP    2 636 474 A1    9/2013

* cited by examiner

SHEAR BLADE AND CUTTING DEVICE

This application is a National Stage Application of PCT/EP2016/076065, filed 28 Oct. 2016, and which application is incorporated herein by reference. To the extent appropriate, a claim of priority is made to the above-disclosed application.

TECHNOLOGICAL BACKGROUND

Hydraulic tools for portable usage are usually used by the fire department for rescue missions. A tool of the type in question, for example, is a cutting device which is predominantly used for cutting body panels and vehicle doors. As a rule, such cutting devices have a hydraulic control with a hydraulic pump which can be located either directly on the cutting device or in an emergency vehicle. In addition, the cutting device comprises two tool halves which are pivotable against one another and each comprise a shear blade for severing or cutting the object to be cut, such as the pillars of a passenger car body. For that purpose, the shear blades have contact surfaces, which are oriented toward one another and generally run straight, and along which the shear blades are guided past one another during pivoting, i.e., during opening and closing.

Greater demands are increasingly imposed on the cutting devices of the type in question with regard to cutting power, resilience, durability, weight, and energy consumption. In this context, cutting power and the durability of the shear blades are particularly crucial. In addition to the material selection and thus the optimization of the material properties of the shear blade, the geometry of the shear blade predominantly contributes to the improvement of the cutting power. The main focus is on improving the cutting strength of the blades such that the same or stronger material can be cut with less power.

DOCUMENTS OF THE PRIOR ART

The patent document DE 10 2009 059 940 B4 describes a shear blade for cutting devices for cutting or severing profiled structural steel. The shear blades are provided with replaceable cutting inserts. The cutting inserts are accommodated in a two-sided open receiving pocket and held by a plurality of clamping claws. By means of threaded and blocking pins, the clamping claws effect a screw and pin connection between the shear blade and the cutting insert. Said clamping claws are attached to the cutting insert via an additional recess and thus require an additional form closure. The receiving pocket is designed such that the cutting insert can be inserted into the recess parallel to the contact surface of the shear blade. The complicated structure of the cutting insert and the receiving pocket, and the complex attachment with clamping claws and pins or screws results in additional problems regarding the production time and the production costs. In addition, the functionality and the durability can be reduced because the additional recesses on the cutting insert produce an additional form closure with the clamping claws which leads to tensions in the area of the fastening means, wherein this can result in a material fracture.

The document AT 511 457 A4 describes a shear blade for a cutting device which, within a seat of the shear blade, comprises a blade insert which is designed as a cutting wedge. The cutting wedge forms a cutting edge in that, beginning from the cutting edge, a flank face, i.e., contact surface, and a pressure face, i.e., outer surface, is provided at an angle to the flank face. The outer surface is designed to be continuously straight with a constant incline. The blade insert is inserted parallel to the contact surface and forms a form closure that acts in a direction transverse to the flank face along a beveled form-closure face located at the lower end of the seat. In addition, the blade insert is fastened to the main body by means of pin-shaped plug-in connections which are oriented perpendicular to the flank face, and which are arranged in aligning holes in the main body of the shear blade and in the blade insert.

The pointed structure of the blade insert increases the risk of breakage because with increasing pressure, the two shear blades rotate against one another. Each of the tips of the shear blades acts as a pivot point, thus resulting in an increased risk of a breaking of the cutting edge of the blade insert during the cutting process. In addition, the force or the pressure transferred to the blade insert during the cutting of the object to be cut is transferred either to the plug-in connection or wedge-shaped to the form-closure face below the blade insert, resulting in both cases in stress peaks and thus in a material fracture and thus in a reduced durability.

Problem Addressed by the Present Invention

The problem addressed by the present invention is that of providing a shear blade of the type in question with a new type of structure, in which the cutting power, the stability, and the durability are improved.

Solution of the Problem

According to the invention, a first surface portion of the outer surface extends away from the cutting edge along the orthogonal O, which meets the contact surface in the region of the cutting edge, or at an acute angle $\alpha$ relative to the orthogonal O. In addition, a second surface portion connects to the end of the first surface portion and, proceeding from the first surface portion, is oriented in an acute angle $\beta$ relative to the orthogonal O. A third surface portion connects to the end of the second surface portion and is oriented in an acute angle $\gamma$ relative to the orthogonal O. Furthermore, the angle $\alpha$ is smaller than the angle $\beta$, and the angle $\beta$ is smaller than the angle $\gamma$. This results in the advantage that a pressure conservation takes place in the region of the cutting edge of the shear blade. The risk of a breaking of the cutting edge is thus reduced, and the stability and durability of the shear blade is increased.

As seen from the cross-section of the shear blade, the width of the first surface portion can expediently be smaller than the width of the second surface portion, and the width of the second surface portion can be smaller than the width of the third surface portion. Since the first surface portion has a very small width, the risk of a slipping off or breaking of the cutting edge particularly in case of a high-strength material can be largely prevented, but the wedge effect, which benefits the cutting process, of the first angled can be used to sever the object to be cut.

Furthermore, the angle $\alpha$ can lie in a range from 0.5 to 5°, preferably in a range from 1 to 3°, particularly preferably in a range from 1.5 to 2.5°. The use of a very small angle $\alpha$ surprisingly results in the effect that a pressure conservation takes place, e.g., 3-8% pressure conservation of an angle of $\alpha=2°$, when compared to an angle $\alpha=0°$.

Expediently, the angle $\gamma$ can be greater than 45°, preferably greater than/equal to 48°, particularly preferably greater than/equal to 50°. As a result the cutting power of the shear blade is further improved. Surprisingly, it has become apparent that with an angle of γ=50°, a particularly good cutting power can be achieved. The angle γ is maximally 80°, preferably 70°, particularly preferably 60°.

In the region of the outer surface, a surface profiling is preferably provided. With the introduction of a profiling, the cutting force onto the material to be cut is converted into a higher cutting pressure. As a result, the material to be cut is subject to a greater stress, resulting in an earlier breakdown.

Expediently, the surface profiling can be provided only in the region of the second and/or third surface portion, preferably in the region of both surface portions; no surface profiling is supposed to be provided in the region of the first surface portion. The purpose of the first surface portion is that of pulling the object to be cut in the direction toward the cutting device, and so the main cutting pressure is applied to the object to be cut by the rear part of the cutting region. As a result, the cutting power is greatly increased. However, a surface profiling within the first surface portion impedes the pulling action of the cutting device.

In addition, the surface profiling can extend over the entire width of the respective surface portion, resulting in a preferably even force effect. Furthermore, additional tension differences are prevented by differently designed surface regions of the outer edge of the shear blade.

Preferably, the surface profiling can comprise individual parallel grooves, wherein the grooves each have two opposite groove walls. Such a surface profiling has proven to have a particularly favorable effect with regard to the pressure conservation at the shear blade which lies in the range from 3-8%, when compared to conventionally designed shear blades.

Preferably, the opposite groove walls of a groove are designed such that one groove wall runs in a steep manner, preferably in a curved manner, and the other groove wall runs in a flattened manner. The steeply running groove wall is arranged on the side of the groove that faces the blade tip of the shear blade, and so the grooves have a preferred orientation in that the groove walls are designed to be oriented away from the blade tip. This results in the advantage that the pulling in of the object to be cut at the beginning of the cutting process and the holding of the object to be cut in the rear part of the cutting region are facilitated during the cutting process.

Alternatively or additionally, the grooves are designed to be wave-like or serrated, U-shaped, V-shaped, or trapeze-shaped.

Expediently, the cutting edge can be curved in a concave manner. This results in the advantage that, during the cutting process, at least at the beginning of the cutting process, the object to be cut is pulled in the direction of the cutting device. The cutting power is thus significantly improved.

Preferably, the shear blade is manufactured as a forging or, e.g., is milled from a semi-finished product or a material plate.

The shear blade can be installed on the cutting device in a simple manner in that the assembly region has a through opening for receiving a rotation axis element, e.g., a central bolt, which a pair of shear blades have in common, and a through opening for receiving an actuation element, e.g., a safety bolt, on the side of the drive, with which the shear blade is fastened to a lever member of a tool arm.

Expediently, the cutting region can have a recess for receiving a cutting insert. The recess is conveniently located at least to some extent in the middle and rear part of the cutting region which is used to transmit the main cutting pressure to the object to be cut. The cutting region is located preferably flush in the recess.

The recess can further be designed such that the cutting insert is insertable in the recess at an acute angle δ to the contact surface of the shear blade. As a result, the cutting insert can be inserted in the shear blade in a particularly simple manner. In addition, this measure allows for an advantageous force absorption by the blade body. Clamping claws are not required.

Preferably, at least one fastening element is provided, the orientation of which runs at a slanted angle ε, i.e., preferably at an acute angle ε, to the contact surface as seen looking in the direction of the cutting edge. This results in the advantage that the pressure transferred to the blade insert by cutting the object to be cut is not transferred to the plug-in connection but to the form closure surface below the blade insert, reducing the risk of a material fracture and thus increasing the durability. Preferably, the fastening element is oriented perpendicularly to the insertion direction of the cutting insert.

Expediently, on at least one, preferably on both sides of the recess, an undercut can be provided which is used to insert the cutting insert in a guided manner into the recess by means of a simple movement and to hold it in position. This particularly simplifies the replacing of the cutting insert.

The present invention further claims a portable, in particular a hydraulic cutting device, preferably a rescue device, for portable use, having a housing and a preferably manually operable, hydraulic control valve, and two tool halves connected to a rotation axis, wherein at least one of the tool halves comprises a shear blade according to the invention, on which a first surface portion of the outer surface extends from the cutting edge at an acute angle α (relative to the orthogonal O, which meets the contact surface in the region of the cutting edge), and a second surface portion connects to the end of the first surface portion and is oriented in an acute angle β relative to the orthogonal O, and a third surface portion connects to the end of the second surface portion and is oriented in an acute angle γ relative to the orthogonal O. Here, the angle α is smaller than the angle β, and the angle β is smaller than the angle γ.

DESCRIPTION OF THE INVENTION USING EMBODIMENTS

Expedient embodiments of the present invention are described in more detail using the drawings.

Figure 1:
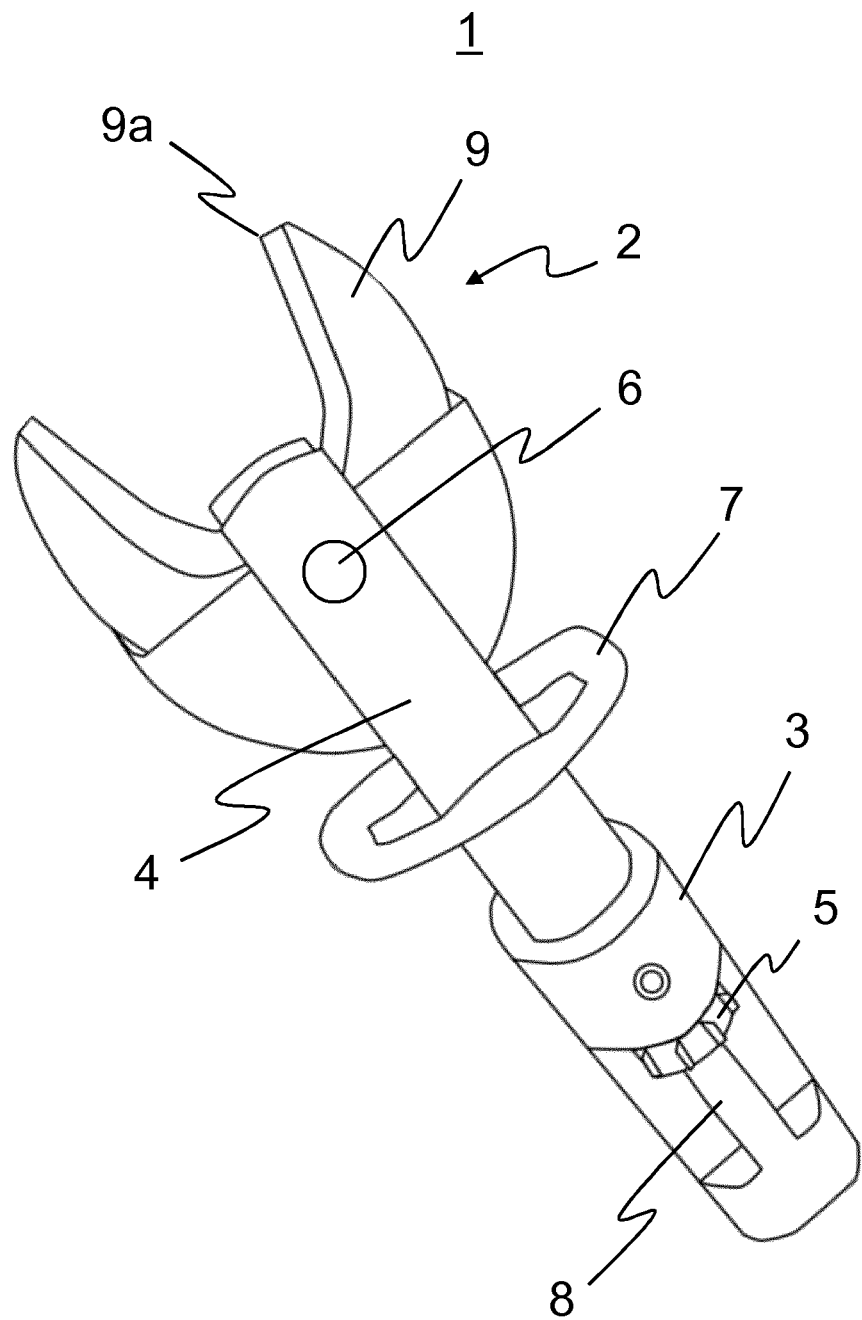
FIG. 1 shows a greatly simplified perspective view of a shear blade according to the invention.

Reference sign 1 in FIG. 1 denotes the portable cutting device for cutting and severing body parts and vehicle doors. The cutting device 1 has a housing 3 and a hydraulic cylinder 4, to which two tool halves are fastened that each comprise a shear blade 2 with a blade body 9 and a blade tip 9a located on said blade body 9. The shear blades 2 are arranged on a common rotation axis 6, and so the shear blades 2 can be pivoted against one another. In the region of the housing 3 and/or the hydraulic cylinder 4, a carrying handle 7 and a handle 8 for carrying the cutting device 1 are additionally arranged. Furthermore, a manually operable control valve 5, which allows the user to manually operate the cutting device (cutting, opening, and idling) is located in the region of the handle 8.

Figure 2:
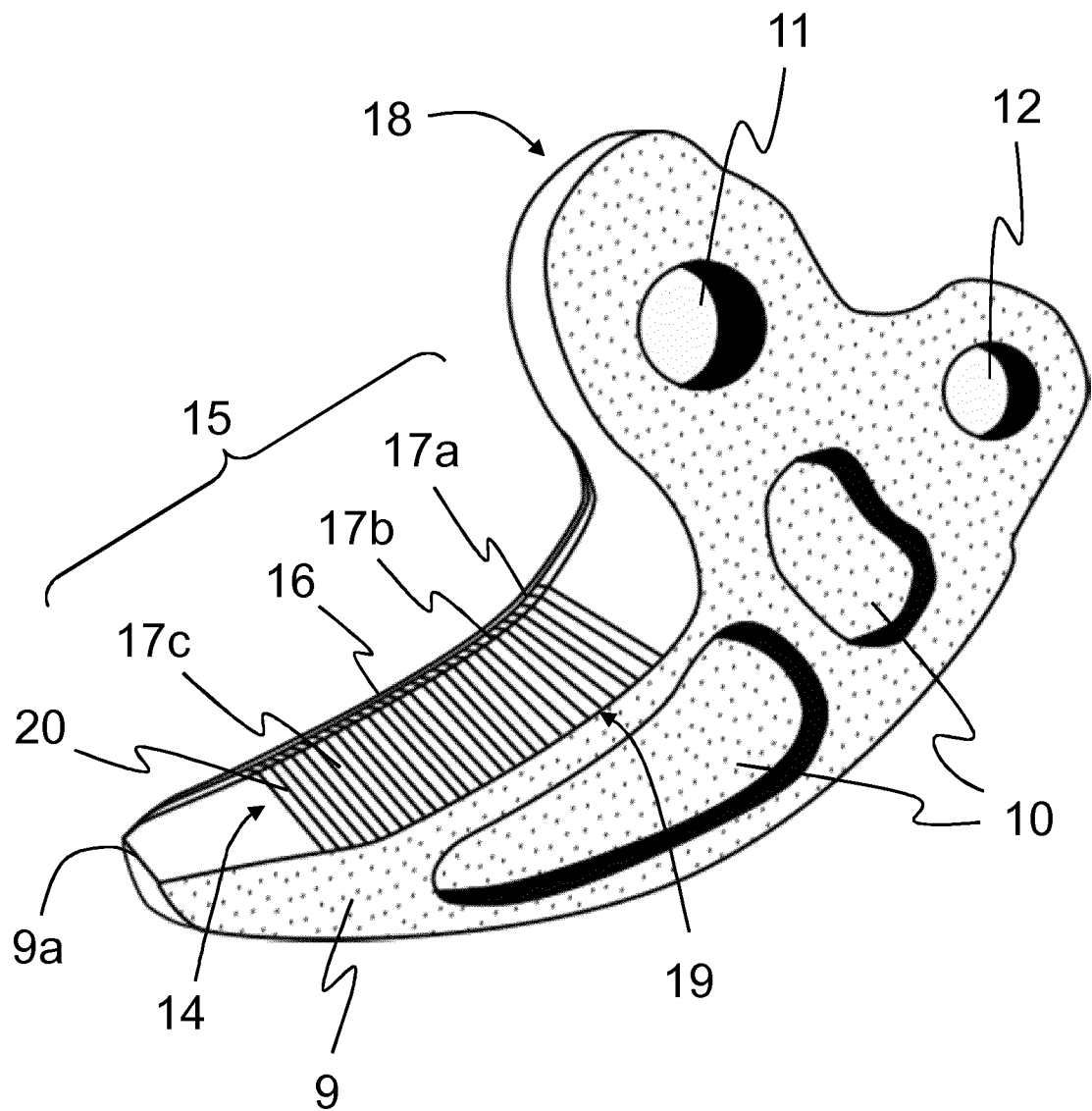
FIG. 2 shows a simplified perspective view of a shear blade according to the invention.

FIG. 2 shows the shear blade 2 of the cutting device 1 in detail. The blade body 9 can preferably be manufactured as a forging or milled from a semi-finished product or a material plate. The blade body 9 comprises recesses 10 which function as a weight reduction of the shear blade 2. The shear blade 2 further comprises an assembly region 18, by means of which the shear blade 2 can be mounted on the cutting device 1. The assembly region 18 comprises a through opening 11 which is used to receive a rotation axis element, e.g., a central bolt (not depicted in FIG. 2), in order to fasten the shear blade 2 to the common rotation axis 6. The assembly region 18 further comprises a through opening 12 which can receive an actuation element, e.g., a safety bolt (not depicted in FIG. 2), on the side of the drive, by means of which the shear blade can be mounted on a lever member of a tool arm in order to control the shear blade 2.

The shear blade 2 comprises a preferably concave cutting region 15 which is used to cut and sever the object to be cut. The object to be cut is cut by a cutting edge 16 and pushed apart along an outer surface 14 of the blade body 9. According to the invention, the outer surface 14 comprises a first surface portion 17a which extends away from the cutting edge 16. A second surface portion 17b connects to the end of the first surface portion 17a, and a third surface portion 17c connects to the second surface portion 17b.

Figure 3:
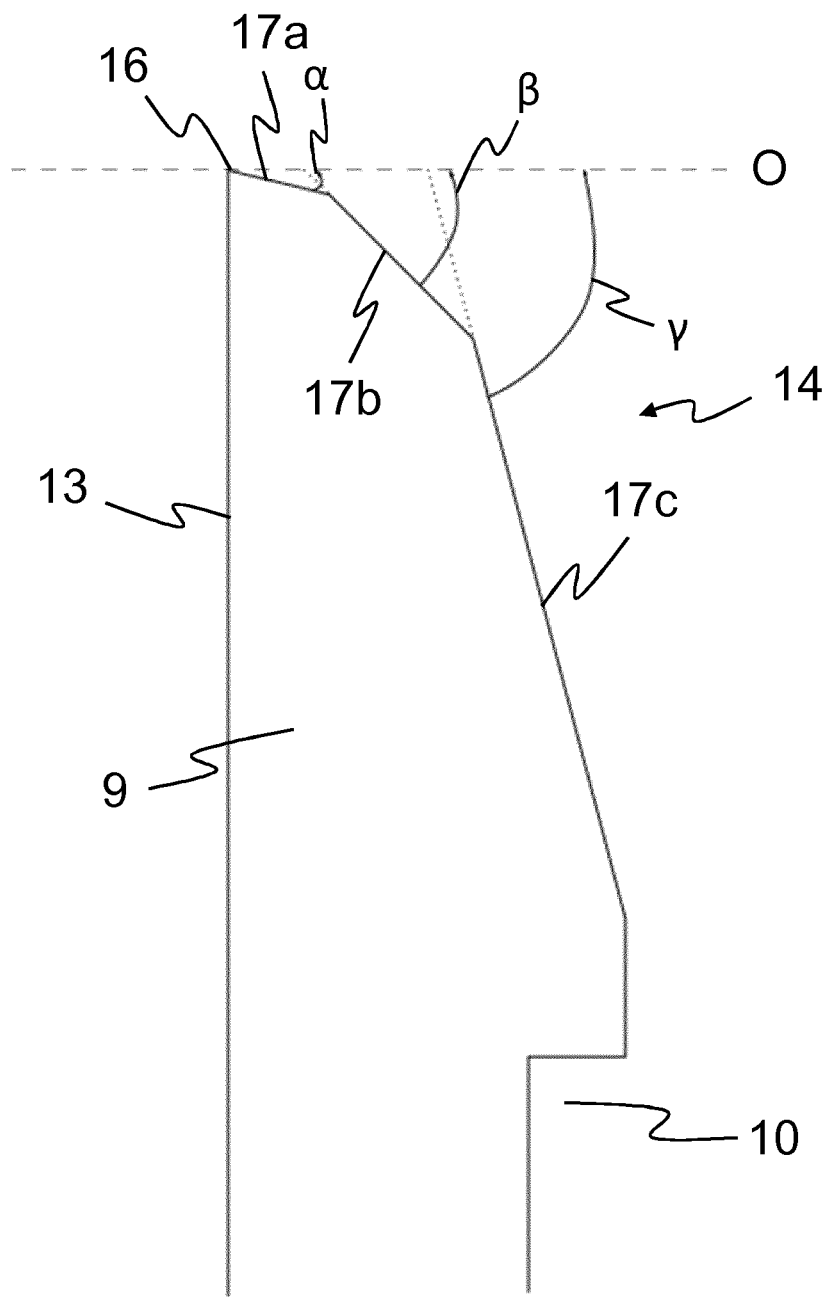
FIG. 3 shows a simplified, merely schematic cross-sectional view of a shear blade according to the invention.

FIG. 3 shows a cross-section of a shear blade 2 according to the invention in the middle cutting region 15. Reference sign 13 denotes a contact surface lying opposite of the outer surface 14. During the opening and closing of the pair of shear blades of a cutting device 1, the shear blades 2 are guided past one another along their contact surfaces 13. The first surface portion 17a extends away from the cutting edge 16 at a small angle α relative to the orthogonal O. The orthogonal O runs perpendicularly to the contact surface 13 and meets said contact surface 13 in the region of the cutting edge 16. The angle α is preferably 0.5°, 1.0°, 1.5°, 2.0°, or 2.5°. The second surface portion 17b, which connects to the first surface portion 17a, extends at an acute angle β relative to the orthogonal O. The angle β lies preferably in a range from 15° to 35°, preferably from 20° to 25°. A third surface portion 17c connects to the second surface portion 17b and is oriented in an acute angle γ relative to the orthogonal O. The angle γ is preferably 40°, 45°, or 50°. Accordingly, the angle α is smaller than the angle β, and the angle β is smaller than the angle γ. The angle γ is maximally 80°, preferably 70°, particularly preferably 60°.

The width of the first surface portion 17a lies preferably in the range from 0.5 to 1.5 mm; the width of the first surface portion 17a lies particularly preferably in the range from 0.5 mm to 0.7 mm. As seen from the cross-section of the shear blade 2, the width of the first surface portion 17a is smaller than the width of the second surface portion 17b, and the width of the second surface portion 17b is smaller than the width of the third surface portion 17c.

Figure 4A:
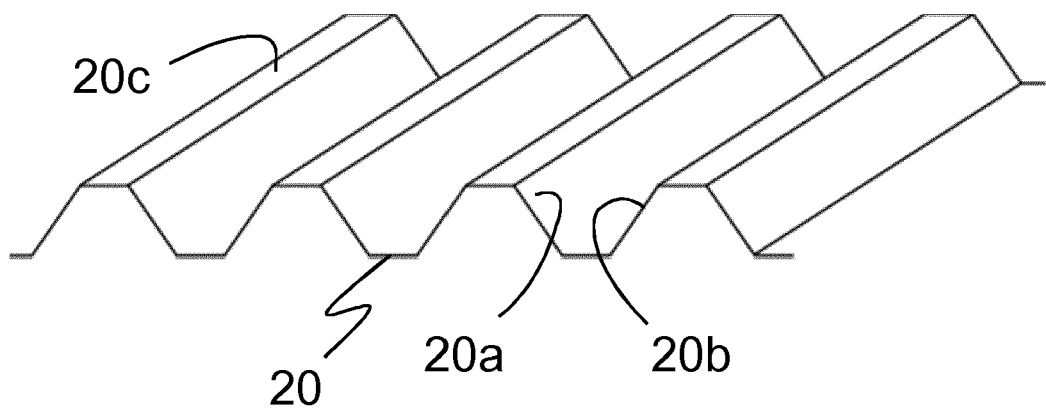
FIG. 4a shows a simplified perspective cross-sectional view of a part of a design of the surface profiling according to the invention.
Figure 4B:
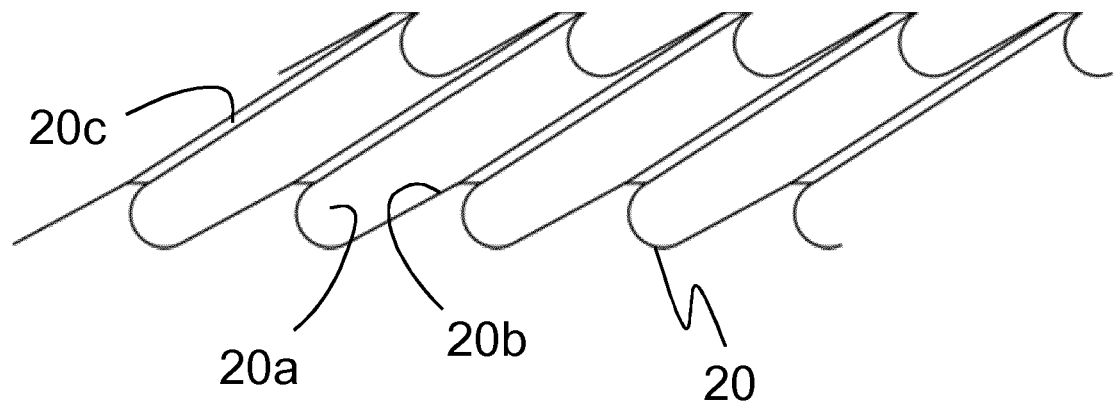
FIG. 4b shows a second simplified perspective cross-sectional view of a part of a second design of the surface profiling according to the invention.

In the cutting region 15, the shear blade 2 in FIG. 2 has a surface profiling 19. The surface profiling 19, for example, can consist of parallel grooves 20 as shown in FIG. 4a. The grooves 20 each comprise two opposite groove walls 20a, 20b and are designed to be trapeze-shaped, wherein the corresponding trapezes form plateaus 20c on the upper side which delimit the surface profiling 19 outwardly toward the object to be cut. With the introduction of said grooves 20, the cutting force onto the material to be cut is converted into a higher cutting pressure. As a result, the material to be cut is subject to a greater stress, resulting in an earlier breakdown. The design of the outer surface 14 with said grooves 20 generally results in a pressure conservation of 3-8%. Therefore, this provides the possibility of increasing the cutting power at a constant force and a constant weight.

Expediently, the surface profiling 19 is located only in the region of the second and/or third surface portion 17b, 17c, preferably running over the entire width of the respective surface portion 17b and/or 17c. This design is advantageous because at the beginning of the cutting process, the object to be cut is pulled along the cutting edge 16 in the direction toward the rotation axis 6, and so the main cutting pressure is applied to the object to be cut by the rear part of the cutting region 15. In the region of the first surface portion 17a, no surface profiling 19 is provided. The pulling in of the object to be cut in the direction of the cutting device 1 is further facilitated by the cutting edge 16 being curved in a concave manner.

In order to further improve the effect of the pulling in of the object to be cut, i.e., to allow for the pulling in also during the initial cutting process, a specific design of the surface profiling 19 or the grooves 20 according to FIG. 4a can be provided. For that purpose, the grooves 20 have a groove wall 20a which runs in a steep and curved manner, and a groove wall 20b which runs in a flattened manner. Such grooves 20, for example, can be milled with a V-shaped milling cutter which is placed obliquely onto the material. Depending on the distance selected for the milled grooves 20, plateaus 20c, which delimit the surface profiling 19 toward the side facing the object to be cut, are located between the grooves 20.

Figure 5:
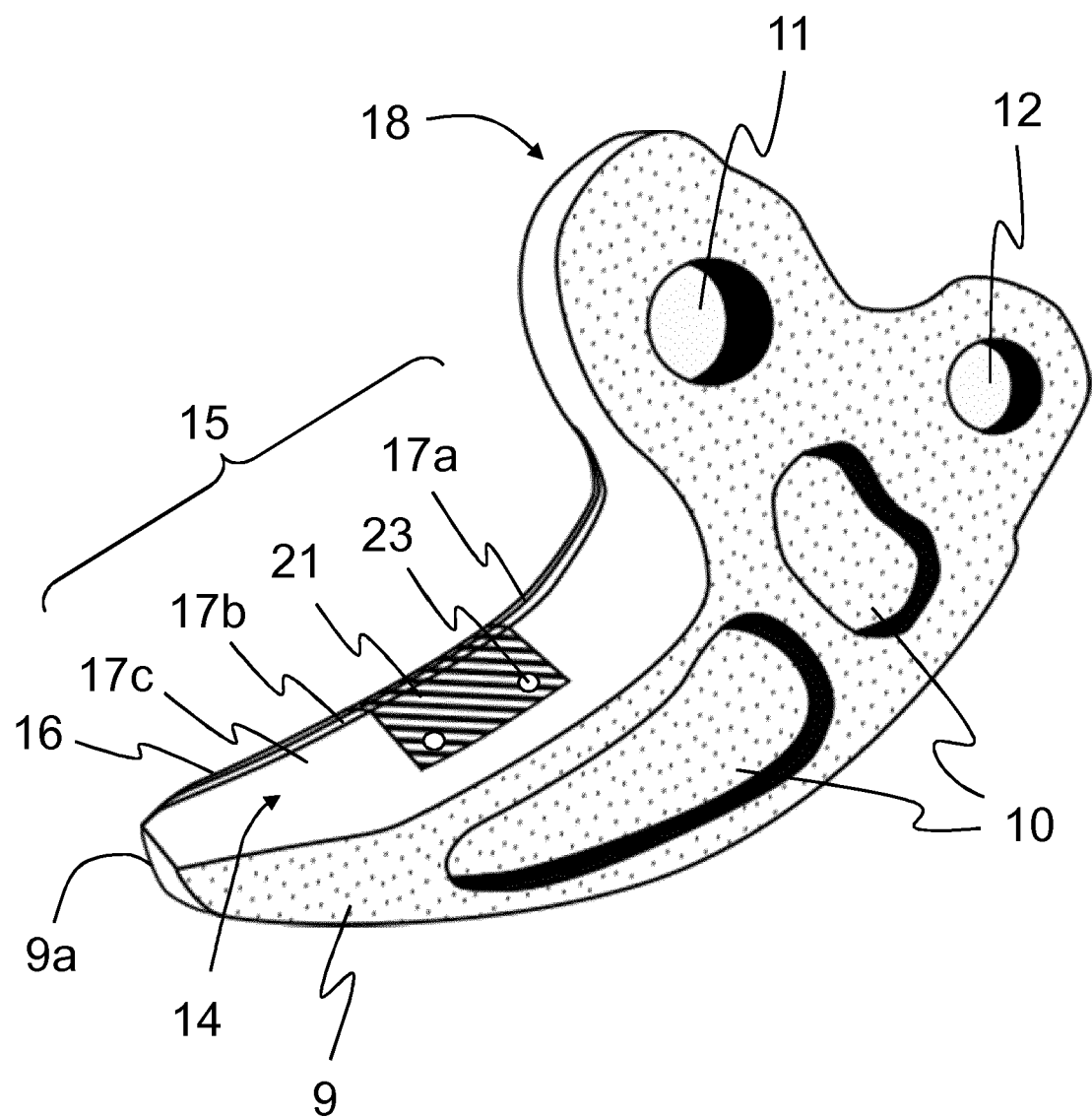
FIG. 5 shows a simplified perspective view of a shear blade according to the invention with a cutting insert.

FIG. 5 shows a second embodiment of the shear blade 2 according to the invention. Here, the shear blade 2 has a cutting insert 21 in the middle and rear part of the cutting region 15. For reasons of clarity, no surface profiling 19 is shown in FIG. 5 which, however, can also be present in the embodiment according to FIG. 5. The cutting insert 21 is fastened to the blade body 9 of the shear blade 2 by means of fastening elements 23. For example, screws, bolts, or the like can be used as the fastening element 23. The cutting insert 21 is inserted in the region of the cutting region 15 which is subject to greater stresses during cutting and thus subject to earlier wear. As a result, the cutting insert 21 can be replaced in case of wear in this region, and the function of the shear blade 2 can be restored without having to replace the entire shear blade 2. In addition, the cutting insert 21 can be made of harder or more resilient material than the basic material of the shear blade 2 in order to reduce the risk of wear and to improve the cutting force. As a result, the cutting power and the durability of the entire shear blade 2 can be improved at almost constant costs and weight. The cutting insert 21 can furthermore also comprise surface portions 17a, 17b, 17c (not depicted in FIG. 5).

Figure 6A:
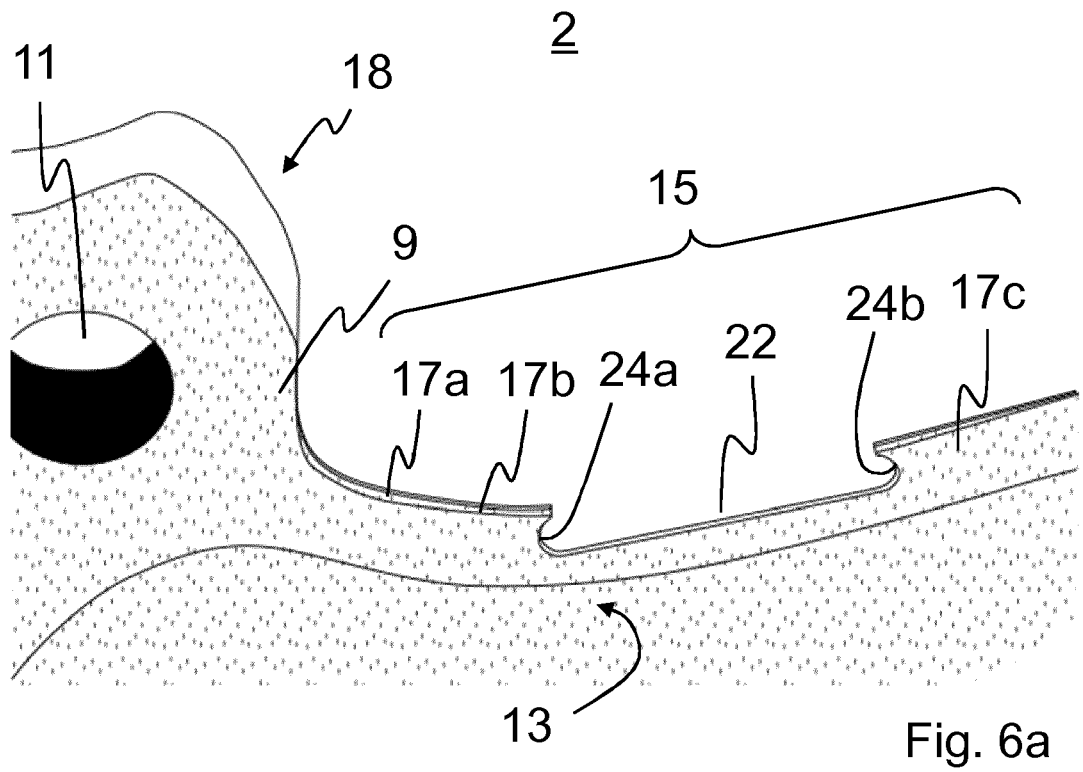
FIG. 6a shows a simplified perspective partial view of the shear blade according to the invention from FIG. 5 with missing cutting insert.
Figure 6B:
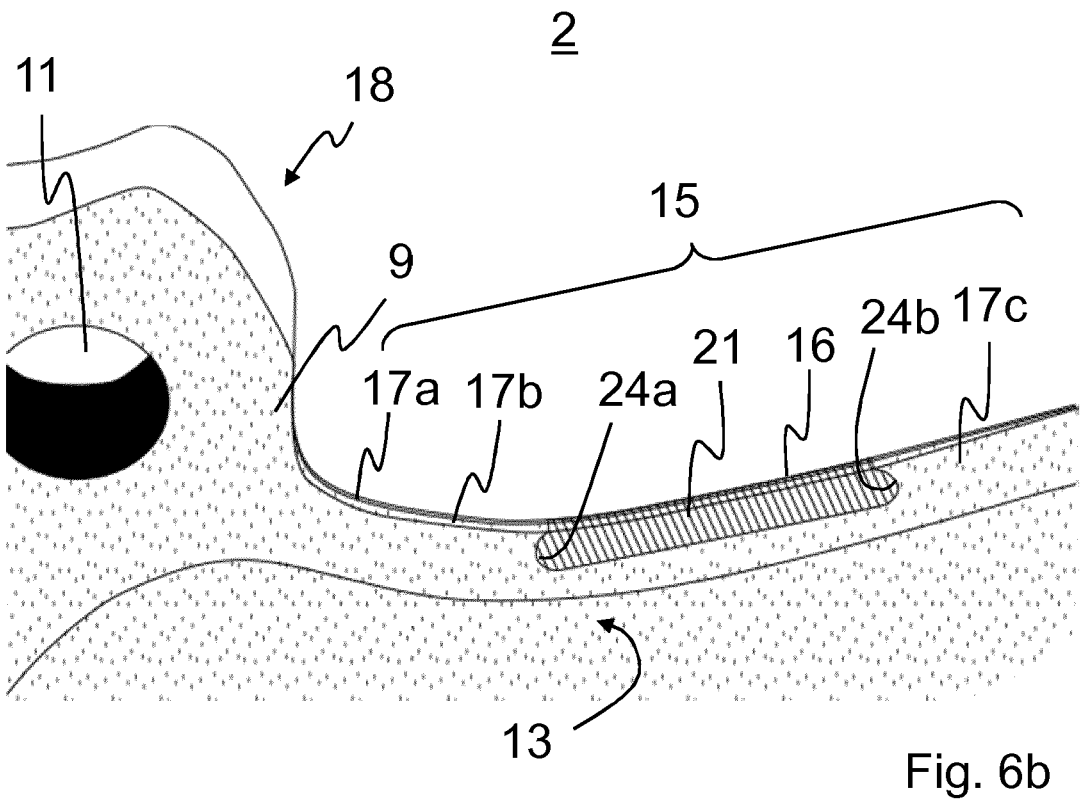
FIG. 6b shows a second simplified perspective partial view of the shear blade according to the invention from FIG. 5 with inserted cutting insert.

Expediently, in the region of the cutting region 15, the shear blade 2 has a recess 22 which is shown in FIG. 6*a* and is used to receive the cutting insert 21. The recess 22 has undercuts 24*a* at the front which are provided to hold the cutting insert 21 in position and/or to guide it during insertion. The cutting insert 21 and the recess 22, as shown in FIG. 6*b*, are manufactured such that a form closure is formed between the cutting insert 21 and the recess 22 as soon as the cutting insert 21 is completely introduced or inserted in the recess 22. For that purpose, the form closure is used to apply the overwhelming portion of the shear stresses occurring during cutting to the components of the shear blade 2 by means of compressive stresses.

Figure 7:
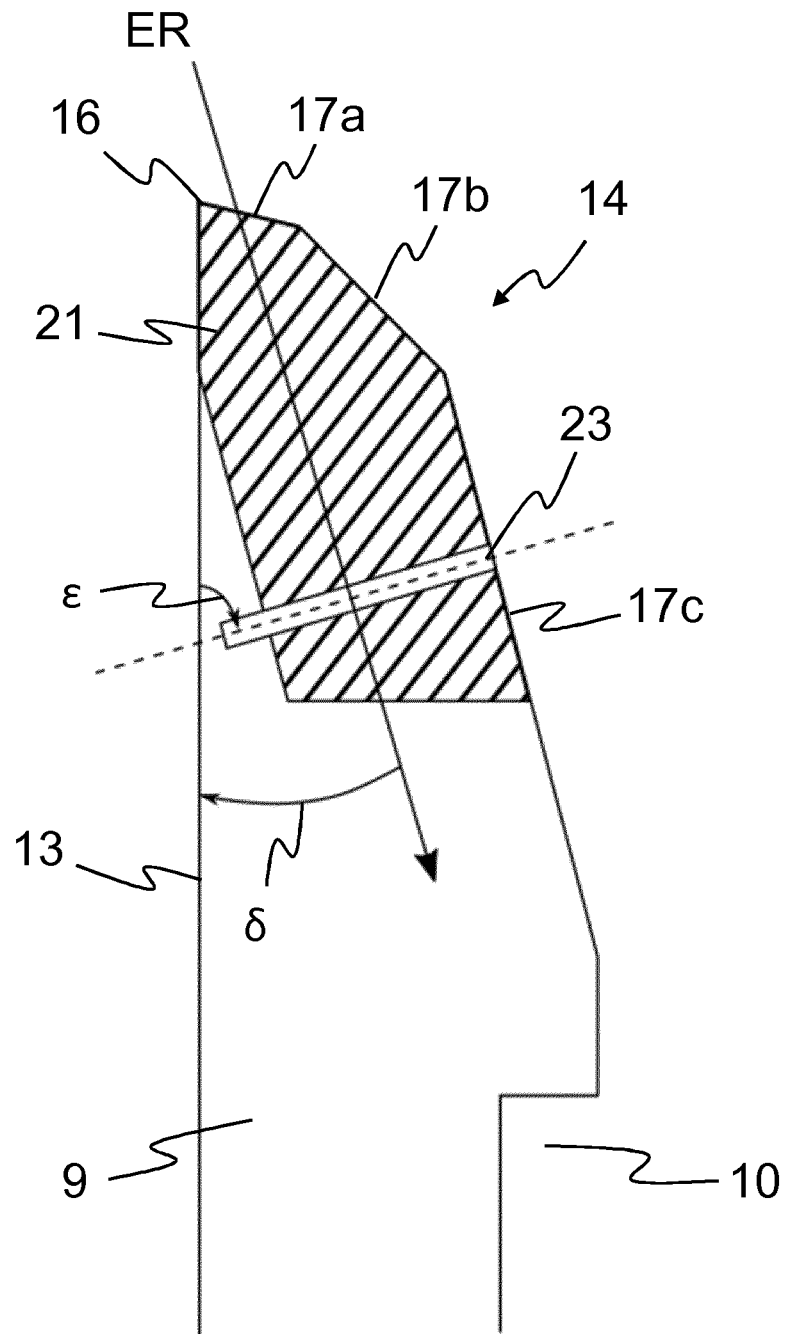
FIG. 7 shows a simplified, merely schematic cross-sectional view of the shear blade according to the invention from FIG. 5.

As shown in FIG. 7, the cutting insert 21 is inserted at a preferably acute angle δ to the contact surface 13. The insertion direction ER of the cutting insert 21 is marked in FIG. 7 with a black arrow. Here, the cutting insert 21 forms a part of the outer surface 14 and comprises, as does the outer surface 14, the surface regions 17*a*, 17*b*, 17*c*. After the insertion of the cutting insert 21, the cutting insert 21 is fastened to the blade body 9 by means of fastening elements 23. The orientation of the fastening elements 23 runs at an acute angle ε toward the contact surface 13 or essentially perpendicularly to the insertion direction ER. The attachments are geometrically designed such that they hold the cutting insert 21 in position within the recess 22 but are subject to as little stress as possible, such as notch stress peaks or high shear stresses, by applying the greater portion of the stresses, e.g., in the form of compressive stress, to the blade body 9 by means of the form closure between the cutting insert 21 and the recess 22.

The disclosure expressly comprises individual combinations of features (sub-combinations) and possible combinations of individual features of different embodiments not shown in the drawings.

LIST OF REFERENCE SIGNS

1 Cutting device
2 Shear blade
3 Housing
4 Hydraulic cylinder
5 Control valve
6 Rotation axis
7 Carrying handle
8 Handle
9 Blade body
9*a* Blade tip
10 Recess
11 Through opening
12 Through opening
13 Contact surface
14 Outer surface
15 Cutting region
16 Cutting edge
17*a* first surface portion
17*b* second surface portion
17*c* third surface portion
18 Assembly region
19 Surface profiling
20 Groove
20*a* Groove wall
20*b* Groove wall
20*c* Plateau
21 Cutting insert
22 Recess
23 Fastening element
24*a* Undercut
24*b* Undercut
O Orthogonal
ER Insertion direction
α Angle
β Angle
γ Angle
δ Angle
ε Angle

The invention claimed is:

1. A shear blade for a portable cutting device comprising:
a blade body, wherein the blade body has an assembly region and a cutting region;
a cutting edge in the cutting region;
a contact surface located on one side of the cutting edge for an additional shear blade and an outer surface located on the other side of the cutting edge, acting on an object to be cut;
a first surface portion of the outer surface extends away from the cutting edge along an orthogonal line, which meets the contact surface at the cutting edge, or at an acute first angle relative to the orthogonal line;
a second surface portion connects to an end of the first surface portion and is oriented in an acute second angle relative to the orthogonal line;
a third surface portion connects to an end of the second surface portion and is oriented in an acute third angle relative to the orthogonal line;
wherein the first angle is smaller than the second angle, and the second angle is smaller than the third angle;
wherein a surface profiling is provided only in a region of the second surface portion and/or the third surface portion of the outer surface.

2. The shear blade according to claim 1, wherein, in a cross-section of the shear blade, a width of the first surface portion is smaller than a width of the second surface portion, and the width of the second surface portion is smaller than a width of the third surface portion.

3. The shear blade according to claim 1, wherein the first angle lies in a range from 0.5° to 5°.

4. The shear blade according to claim 1, wherein the third angle is greater than/equal to 45°.

5. The shear blade according to claim 1, wherein the surface profiling extends over an entire width of the respective surface portion.

6. The shear blade according to claim 1, wherein the surface profiling comprises individual parallel grooves.

7. The shear blade according to claim 6, wherein the grooves each comprise two opposite groove walls, one of the groove walls runs in a steep manner, and the other of the groove walls runs in a flattened manner, wherein the steeply running one of the groove walls is arranged on a side of the groove facing a blade tip of the shear blade.

8. The shear blade according to claim 6, wherein the grooves are U-shaped, V-shaped, or trapeze-shaped.

9. The shear blade according to claim 1, wherein the cutting edge is curved in a concave manner.

10. The shear blade according to claim 1, wherein the assembly region has a through opening for receiving a rotation axis element, which a pair of the shear blades have in common, and a through opening for connecting an actuation element on a side of a drive.

11. The shear blade according to claim 1, wherein the cutting region has a recess for receiving a cutting insert.

12. The shear blade according to claim 11, wherein the recess is configured such that the cutting insert is insertable in the recess at an acute angle to the contact surface of the shear blade.

13. The shear blade according to claim 11, wherein at least one fastening element is provided, an orientation of the at least one fastening element runs at a slanted angle to the contact surface.

14. The shear blade according to claim 11, comprising an undercut on at least one side of the recess.

15. A portable cutting device comprising:
a housing,
a hydraulic cylinder,
a manually operable, hydraulic control valve,
two tool halves connected to a rotation axis, each of the tool halves comprising a shear blade according to claim 1.

* * * * *